Patented Jan. 27, 1953

2,626,907

UNITED STATES PATENT OFFICE 2,626,907

PROCESS FOR BREAKING PETROLEUM EMULSIONS

Melvin De Groote, University City, Mo., assignor to Petrolite Corporation, a corporation of Delaware No Drawing. Application May 14, 1951,
Serial No. 226,314

11 Claims. (Cl. 252—340)

The present invention is a continuation-in-part of my co-pending applications, Serial Nos. 127,773 (now Patent 2,552,533, granted May 15, 1951) and 127,774 (now abandoned) both filed November 16, 1949. Said aforementioned co-pending applications represent in turn a continuation-in-part of my co-pending applications, Serial Nos. 104,801 (now Patent 2,552,528, granted May 15, 1951) and 104,802 (now abandoned), both filed July 14, 1949. See also my co-pending applications, Serial Nos. 104,805 (now Patent 2,554,667, granted May 29, 1951) and 104,806 (now abandoned), both filed July 14, 1949.

The present invention is concerned with a process for breaking petroleum emulsions of the water-in-oil type characterized by subjecting the emulsion to the action of a demulsifier including acidic fractional esters; said acidic fractional esters being those of (A) a polycarboxy acid and (B) high molal oxypropylated polypentaerythritols, the polypentaerythritols being free from any radical having at least 8 uninterrupted carbon atoms, the oxypropylation being carried to an extent such that the oxypropylated product has a molecular weight between 5,000 and 65,000 on an average statistical basis, and is xylene soluble, the polypentaerythritol representing not more than 7% by weight of the oxypropylated product, and with the proviso that one mole of polycarboxy acid be used for each available hydroxyl radical of the oxypropylated polypentaerythritol. The molecular weight given above is based on the assumption of complete reaction between the propylene oxide and the polypentaerythritol, and, of course, the weights are on a statistical basis.

Complementary to the aspect of the invention herein disclosed is my companion invention concerned with the new chemical products or compounds used as the demulsifying agents in the processes or procedures of this invention, as well as the application of such chemical compounds, products, or the like, in various other arts and industries, along with the method for manufacturing said new chemical products or compounds which are of outstanding value in demulsification. See my co-pending application, Serial No. 226,315, filed May 14, 1951.

For convenience, what is said hereinafter is divided into four parts:

Part 1 is concerned with the description of the polyhydric reactants employed, as well as reference to other compounds, products, etc., so there may be a clear line of demarcation between the present invention and what may appear elsewhere;

Part 2 is concerned with the preparation of the oxypropylated derivatives;

Part 3 is concerned with the preparation of the acidic esters by reacting the polyhydroxylated compounds with polycarboxy acids; and Part 4 is concerned with the use of such acidic fractional esters as demulsifiers for resolving petroleum emulsions of the water-in-oil type.

PART 1

Generally speaking, organic compounds having approximately the same number of oxygen atoms as carbon atoms are apt to be, and almost invariably are, water-soluble, and the most common could be illustrated by ethyl alcohol, methyl alcohol, acetic acid, acetone, formaldehyde, etc. When compounds reach enormously high molecular weights compared with such simple compounds, for instance, in the category of 30,000 to 50,000, or upward and preferably upward, such approximate ratio of carbon to oxygen does not necessarily guarantee water-solubility as, for example, in the case of cellulose or possibly some starches. There are other classe of comparatively low molecular weight compounds, for instance, polypentaerythritols, varying from tri-pentaerythritol, where the molecular weight varies roughly from 372 to 1200, which are not water-soluble in the ordinary sense. Pentaerythritol is fairly water-soluble, approximately 4% or 5% in water at ordinary temperature. Di-pentaerythritol is soluble to the extent of two-tenths of one per cent.

The present invention, as has been pointed out previously, is concerned with acidic fractional esters which, in turn, are obtained from the oxypropylation products derived from dipentaerythritol and higher polypentaerythritols. Such oxypropylation is conducted to the stage where the end products are xylene-soluble and have a molecular weight within the range of 5,000 to 65,000. Such polyhydric compounds after oxypropylation are subjected to reaction with polycarboxy acids so as to yield acid esters. The acid esters so obtained are valuable for numerous purposes and particularly for resolution of water-in-oil emulsions. The oxypropylation derivatives prior to esterification may be considered conveniently as intermediates.

The acidic fractional esters owe their valuable properties, at least in part, to the inherent properties of the parent hydroxy compound or the derivatives which have been previously referred to as intermediates. These intermediate compounds herein described owe their peculiar properties to a number of factors immediately enumerated at least in part:

(a) Size of molecule
(b) Shape of molecule as far as space configuration goes
(c) Absence of a single hydrophobe group having as many as 8 uninterrupted carbon atoms in a single radical
(d) Substantial insolubility in water in certain instances
(e) Solubility in xylene
(f) The fact that the initial reactant requires the presence of at least 6 hydroxyl radicals
(g) Such combination being obtained by reaction involving propylene oxide.

My preferred initial reactants are the polypentaerythritols as herein described. For purpose of convenience the word "polypentaerythritol" will mean those higher derivatives beginning with dipentaerythritol, up to and including the deca-pentaerythritols, or other comparable members of the class. In this connection in regard to the preparation of polypentaerythritols attention is directed to U. S. Patent No. 2,462,049, dated February 15, 1949, to Wyler. For instance, this patent mentions, among other things, the following:

|  | Molecular weight |
|---|---|
| Tri-pentaerythritol | 372.41 |
| Tetra-pentaerythritol | 490.54 |
| Penta-pentaerythritol | 608.67 |
| Hexa-pentaerythritol | 726.80 |
| Hepta-pentaerythritol | 844.93 |
| Octa-pentaerythritol | 963.06 |
| Nona-pentaerythritol | 1,081.19 |
| Deca-pentaerythritol | 1,199.32 |

Other procedures have been described for preparing polypentaerythritol, using some other catalyst as described in British Patent No. 615,370, to Marrian and McLean (Imperial Chemical Industries, Ltd.)

The same catalyst as used in the above two mentioned issued patents illustrates a class of catalyst employed also to produce etherization in numerous other polyhydric compounds as, for example, in the case of polyglycerols, sorbitol, etc., etc. It is obvious that modified polypentaerythritols can be obtained by inter-mixing with another polyhydric alcohol, even though not water-insoluble, followed by etherization, to produce the higher molecular weight product. For instance, two moles of tripentaerythritol could be polymerized with one mole of glycol or diglycerol to give a modified hexa-pentaerythritol which, in essence, might be somewhat analogous to a hexa-pentaerythritol treated with glycide, although not necessarily so. Similarly, other polyhydric alcohols, such as sorbitol, sorbitan, mannitan, mannitol, and tetramethylolhexanol, can be employed, provided, however, that the resultant used as an initial reactant is water-insoluble, and xylene-insoluble, has at least 6-hydroxyls and a molecular weight not in excess of 1200. Such materials can be varied in an inconsequential or insignificant sort of way without detracting from the structure of the final oxypropylated derivative; for instance, a number of the hydroxyl groups might be converted into an acetal or a ketal in the conventional manner; or one might produce an ester of a low molal acid, such as acetic acid, glycollic acid, lactic acid, propionic acid, etc. Tripentaerythritol could be treated with a mole of ethylene oxide or several moles of ethylene oxide, or a mole of glycide, or a mole of butylene oxide, or methyl glycide, and then subjected to polymerization so as to give materials which, obviously, are the chemical and also physical-chemical equivalent of the herein specified, preferred and commercially available reactants, i. e., the polypentaerythritols.

My preferred reactants are tripentaerythritol, which is sold commercially, and a higher polypentaerythritol (average hydroxyl content 32.3). My third preferred reactant is the tetrapentaerythritol manufactured in the manner described in Example 2 of aforementioned British Patent No. 615,370.

In a preceding paragraph reference has been made to substantial insolubility in water in certain cases. In examining the data in Part 2 of the text it will be noted that the derivatives are limited to those which show xylene-solubility and that in the higher stages of oxypropylation the derivatives show water-insolubility or substantial water-insolubility. This is illustrated by examples and, as a matter of fact, in many instances the water-insoluble derivatives are particularly to be preferred for use as demulsifiers.

For a number of well known reasons equipment, whether laboratory size, semi-pilot plant size, pilot plant size, or large scale size, is not as a rule designed for a particular alkylene oxide. Invariably and inevitably, however, or particularly in the case of laboratory equipment and pilot plant size the design is such as to use any of the customarily available alkylene oxides, i. e., ethylene oxide, propylene oxide, butylene oxide, glycide, epichlorohydrin, styrene oxide, etc. In the subsequent description of the equipment it becomes obvious that it is adapted for oxyethylation as well as oxypropylation.

Oxypropylations are conducted under a wide variety of conditions, not only in regard to presence or absence of catalyst, and the kind of catalyst, but also in regard to the time of reaction, temperature of reaction, speed of reaction, pressure during reaction, etc. For instance, oxyalkylations can be conducted at temperatures up to approximately 200° C. with pressures in about the same range up to about 200 pounds per square inch. They can be conducted also at temperatures approximating the boiling point of water or slightly above, as for example 95° to 120° C. Under such circumstances the pressure will be less than 30 pounds per square inch unless some special procedure is employed as is sometimes the case, to wit, keeping an atmosphere of inert gas such as nitrogen in the vessel during the reaction. Such low-temperature-low reaction rate oxypropylations have been described very completely in U. S. Patent No. 2,448,664, to H. R. Fife et al., dated September 7, 1948. Low temperature, low pressure oxypropylations are particularly desirable where the compound being subjected to oxypropylation contains one, two or three points of reaction only, such as monohydric alcohols, glycols and triols.

Since low pressure-low temperature low-reaction-speed oxypropylations require considerable time, for instance, 1 to 7 days of 24 hours each to complete the reaction they are conducted as a rule whether on a laboratory, pilot plant scale, or large scale, so as to operate automatically. The prior figure of seven days applies especially to large-scale operations. I have used conventional equipment with two added automatic features; (a) a solenoid controlled valve which shuts off the propylene oxide in event that the temperature gets outside a predetermined and set range, for instance, 95° to 120° C., and (b) another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose where the pressure of reaction is higher, speed of reaction is higher, and time of reaction is much shorter. In such instances such automatic controls are not necessarily used.

Thus, in preparing the various examples I have found it particularly advantageous to use laboratory equipment or pilot plant equipment which is designed to permit continuous oxyalkylation whether it be oxypropylation or oxyethylation. With certain obvious changes the equipment can be used also to permit oxyalkylation involving the use of glycide where no pressure is involved except the vapor pressure of a solvent, if any, which may have been used as a diluent.

As previously pointed out the method of using propylene oxide is the same as ethylene oxide. This point is emphasized only for the reason that the apparatus is so designed and constructed as to use either oxide.

The oxypropylation procedure employed in the preparation of the oxyalkylated derivatives has been uniformly the same, particularly in light of the fact that a continuous automatically-controlled procedure was employed. In this procedure the autoclave was a conventional autoclave made of stainless steel and having a capacity of approximately 15 gallons and a working pressure of one thousand pounds gauge pressure. This pressure obviously is far beyond any requirement as far as propylene oxide goes unless there is a reaction of explosive violence involved due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet; pressure gauge, manual vent line; charge hole for initial reactants; at least one connection for introducing the alkylene oxide, such as propylene oxide or ethylene oxide, to the bottom of the autoclave; along with suitable devices for both cooling and heating the autoclave, such as a cooling jacket, and, preferably, coils in addition thereto, with the jacket so arranged that it is suitable for heating with steam or cooling with water and further equipped with electrical heating devices. Such autoclaves are, of course, in essence small-scale replicas of the usual conventional autoclave used in oxyalkylation procedures. In some instances in exploratory preparations an autoclave having a smaller capacity, for instance, approximately 3½ liters in one case and about 1¾ gallons in another case, was used.

Continuous operation, or substantially continuous operation, was achieved by the use of a separate container to hold the alkylene oxide being employed, particularly propylene oxide. In conjunction with the smaller autoclaves, the container consists essentially of a laboratory bomb having a capacity of about one-half gallon, or somewhat in excess thereof. In some instances a larger bomb was used, to wit, one having a capacity of about one gallon. This bomb was equipped, also, with an inlet for charging, and an eductor tube going to the bottom of the container so as to permit discharging of alkylene oxide in the liquid phase to the autoclave. A bomb having a capacity of about 60 pounds was used in connection with the 15-gallon autoclave. Other conventional equipment consists, of course, of the rupture disc, pressure gauge, sight feed glass, thermometer connection for nitrogen for pressuring bomb, etc. The bomb was placed on a scale during use. The connections between the bomb and the autoclave were flexible stainless steel hose or tubing so that continuous weighings could be made without breaking or making any connections. This applies also to the nitrogen line, which was used to pressure the bomb reservoir. To the extent that it was required, any other usual conventional procedure or addition which provided greater safety was used, of course, such as safety glass protective screens, etc.

Attention is directed again to what has been said previously in regard to automatic controls which shut off the propylene oxide in event temperature of reaction passes out of the predetermined range or if pressure in the autoclave passes out of predetermined range.

With this particular arrangement practically all oxypropylations become uniform in that the reaction temperature was held within a few degrees of any selected point, for instance, if 105° C. was selected as the operating temperature the maximum point would be at the most 110° C. or 112° C., and the lower point would be 95° or possibly 98° C. Similarly, the pressure was held at approximately 30 pounds maximum within a 5-pound variation one way or the other, but might drop to practically zero, especially where no solvent such as xylene is employed. The speed of reaction was comparatively slow under such conditions as compared with oxyalkylations at 200° C. Numerous reactions were conducted in which the time varied from one day (24 hours) up to three days (72 hours), for completion of the final member of a series. In some instances the reaction may take place in considerably less time, i. e., 24 hours or less, as far as a partial oxypropylation is concerned. The minimum time recorded was about a 3-hour period in a single step. Reactions indicated as being complete in 10 hours may have been complete in a lesser period of time in light of the automatic equipment employed. This applies also where the reactions were complete in a shorter period of time, for instance, 4 to 5 hours. In the addition of propylene oxide, in the autoclave equipment as far as possible the valves were set so all the propylene oxide if fed continuously would be added at a rate so that the predetermined amount would react within the first 15 hours of the 24-hour period or two-thirds of any shorter period. This meant that if the reaction was interrupted automatically for a period of time for pressure to drop or temperature to drop the predetermined amount of oxide would still be added in most instances well within the predetermined time period. Sometimes where the addition was a comparatively small amount in a 10-hour period there would be an unquestionable speeding up of the reaction, by simply repeating the examples and using 3, 4 or 5 hours instead of 10 hours.

When operating at a comparatively high temperature, for instance, between 150° to 200° C., an unreacted alkylene oxide such as propylene oxide, makes its presence felt in the increase in pressure or the consistency of a higher pressure. However, at a low enough temperature it may happen that the propylene oxide goes in as a liquid. If so, and if it remains unreacted there is, of course, an inherent danger and appropriate steps must be taken to safeguard against this possibility; if need be a sample must be withdrawn and examined for unreacted propylene oxide. One obvious procedure, of course, is to oxypropylate at a modestly higher temperature, for instance, at 140° to 150° C. Unreacted oxide affects determination of the acetyl or hydroxyl value of the hydroxylated compound obtained.

The higher the molecular weight of the compound, i. e., towards the latter stages of reaction, the longer the time required to add a given amount of oxide. One possible explanation is that the molecule, being larger, the opportunity for random reaction is decreased. Inversely, the lower the molecular weight the faster the reaction takes place. For this reason, sometimes at least, increasing the concentration of the catalyst does not appreciably speed up the reaction, particularly when the product subjected to oxyalkylation has a comparatively high molecular weight. However, as has been pointed out previously, operating at a low pressure and a low temperature even in large scale operations as much as a week or ten days time may lapse to obtain some of the higher molecular weight derivatives from monohydric or dihydric materials.

In a number of operations the counterbalance scale or dial scale holding the propylene oxide bomb was so set that when the predetermined amount of propylene oxide had passed into the reaction the scale movement through a time operating device was set for either one to two hours so that reaction continued for 1 to 3 hours after the final addition of the last propylene oxide and thereafter the operation was shut down. This particular device is particularly suitable for use on larger equipment than laboratory size autoclaves, to wit, on semi-pilot plant or pilot plant size, as well as on large scale size. This final stirring period is intended to avoid the presence of unreacted oxide.

In this sort of operation, of course, the temperature range was controlled automatically by either use of cooling water, steam, or electrical heat, so as to raise or lower the temperature. The pressuring of the propylene oxide into the reaction vessel was also automatic insofar that the feed stream was set for a slow continuous run which was shut off in case the pressure passed a predetermined point as previously set out. All the points of design, construction, etc., were conventional including the gauges, check valves and entire equipment. As far as I am aware at least two firms, and possibly three, specialize in autoclave equipment such as I have employed in the laboratory, and are prepared to furnish equipment of this same kind. Similarly pilot plant equipment is available. This point is simply made as a precaution in the direction of safety. Oxyalkylations, particularly involving ethylene oxide, glycide, propylene oxide, etc., should not be conducted except in equipment specifically designed for the purpose.

What is said here immediately following is essentially the same data which appears in my two previously-referred to co-pending applications, Serial Nos. 127,773 and 127,774, both filed November 16, 1949. Although I have prepared acidic esters from the compounds described in this subject matter immediately following, yet the polypentaerythritols which are more readily available commercially and, in fact, available from more than one source, are dipentaerythritols and tripentaerythritols. It is my preference to have a very complete description of the acidic esters derived from these two latter compounds. Therefore, after this initial presentation identical with what was said in Serial Nos. 127,773 and 127,774, I have included extensive data as to these lower monomeric derivatives of pentaerythritol. For purpose of clarity I am designating the older series by Examples 1, 2, 3, etc., and the new series as Examples 1a, 2a, 3a, etc.

*Example 1*

The reaction vessel employed was a stainless steel autoclave with the usual devices for heating, heat control, stirrer, inlet, outlet, etc., which are conventional in this type of apparatus. Two different sizes were employed. In part of the experiments the capacity of the autoclave was 3½ liters, and in the other experiments a 5-liter capacity autoclave was employed. This was purely a matter of convenience. Otherwise the construction and operation of both autoclaves were the same. In both instances the stirrers operated at a speed of approximately 300 to 350 R. P. M. There were charged into the autoclave 200 grams of tripentaerthyritol along with 200 grams of solvent (xylene). Any nonvolatile inert solvent, such as xylene, decalin, diethylether of ethylene glycol, or a higher boiling aromatic solvent, such as mesitylene, can be used. Approximately 10 grams of catalyst were added. Sodium methylate was used although ground caustic soda or ground caustic potash or any one of a number of other alkaline catalysts are equally suitable. The autoclave was sealed, swept with nitrogen gas, and stirring started immediately and heat applied, and the temperature allowed to rise to approximately 160° C. At this point addition of propylene oxide was started. It was added continuously at such speed that it was absorbed by the reaction as rapidly as added. During this first period approximately 1650 grams of propylene oxide were added. The time required was 3¼ hours. The maximum temperature was 185° C.

The product obtained showed dispersibility in water and was not appreciably soluble in xylene. Part of the batch was allowed to stay in the autoclave. The exact amount was 790.5 grams. The amount of solvent present was 85 grams. No additional sodium methylate was added. In this second stage 895 grams of propylene oxide were added. The time required was 2 hours. The maximum temperature was 173° C., and the maximum pressure 100 pounds per square inch. At the end of the reaction time the ratio of propylene oxide to initial reactant was 120 to 1 as compared to 53 to 1 in the first stage. The product still showed some tendency to disperse in water but was xylene-soluble.

The further addition of propylene oxide was made in subsequent stages until the product was practically insoluble in water. The data are recorded in the following table. It is to be noted that additionally two other polypentaerythritols were treated with propylene oxide and data included in the table, also.

vary somewhat from the theoretical formula. For this reason, in the claims 65,000 was set as the upper limit.

It is obvious that certain modifications can be made which do not depart from the spirit of the invention. The initial raw materials, i. e., the specified polypentaerythritols or modifications thereof which bear a simple generic relationship to polypentaerythritols are water-insol-

| Ex. No. | Derivative No. | Amt. Taken, Gms. (Solvent Free) | Solvent Present, Gms. (Xylene) | Sod. Methylate Added, Gms. | PrO Added, Gms. | Time (hrs.) | Temp., Max., °C. | Max. Pres., lbs. per sq. in. | Molar Ratio of PrO to Initial Reactant | Solubility in Water | Solubility in Xylene | Molecular Wt. |
|---|---|---|---|---|---|---|---|---|---|---|---|---|
| 1 | A* | 200 | 20 | 10 | 1,650 | 3¼ | 185 | 100 | 53:1 | Dispersible. | No | 3,450 |
| 2 | 1 | 790.5 | 85 | -------- | 895 | 2 | 173 | 100 | 120:1 | Tendency to disprs. | Yes | 7,432 |
| 3 | 2 | 743 | 9 | -------- | 700 | 3¼ | 186 | 135 | 240:1 | Less disprs. | Yes | 14,290 |
| 4 | 3 | 725 | 4 | 3 | 350 | 2¾ | 190 | 132 | 360:1 | Almost insol. | Yes | 21,000 |
| 5 | B* | 245 | 200 | 12.5 | 3,063 | 2 | 170 | 90 | 179:1 | Dispers | Yes | 11,285 |
| 6 | 5 | 613.2 | 37.8 | -------- | 307 | 1 | 165 | 90 | 279:1 | Almost Dispers. | Yes | 17,085 |
| 7 | 6 | 688.1 | 27.9 | 2 | 102 | ¼ | 170 | 180 | 328:1 | Insol | Yes | 20,195 |
| 8 | 7 | 547.8 | 19.2 | -------- | 160 | ¼ | 165 | 100 | 418:1 | Insol | Yes | 27,200 |
| 9 | 8 | 545 | 15 | 2 | 58 | ½ | 180 | 110 | 468:1 | Insol | Yes | 31,100 |
| 10 | C* | 490 | 300 | 12 | 1,750 | 2¾ | 192 | 130 | 30:1 | Disprs | No | 2,240 |
| 11 | 10 | 553 | 75 | -------- | 580 | 3¼ | 188 | 104 | 70:1 | Almost Disprs. | No | 4,450 |
| 12 | 11 | 567 | 37 | -------- | 580 | 2½ | 165 | 102 | 150:1 | Almost insol. | Yes | 9,200 |
| 13 | 12 | 573 | 18 | 3 | 290 | 1¼ | 135 | 90 | 230:1 | Insol | Yes | 13,340 |
| 14 | 13 | 431 | 9 | -------- | 290 | 2¼ | 145 | 108 | 310:1 | Insol | Yes | 18,510 |
| 15 | 14 | 721 | 9 | -------- | 290 | 1¾ | 125 | 125 | 390:1 | Insol | Yes | 23,100 |

A*—tripentaerythritol.
B*—heptapentaerythritol.
C*—tetra-pentaerythritol.

The products obtained above, of course, contain a solvent, to wit, xylene in this particular instance. The solvent can be removed in the conventional manner by vacuum distillation. In the case of xylene a temperature of 180° C. to 200° C. is perfectly satisfactory. The products obtained are usually viscous somewhat sirupy liquids of an amber, dark amber, or reddish color. The color may be due to a trace of iron because of contamination from the vessel employed. However, even when stainless steel is employed of such character that contamination by iron seems out of the question, there is still discoloration, probably due to the inherent nature of the initial raw material or a subsequent carmelization-like reaction.

The derivatives so obtained can be decolorized in the usual manner by treating with charcoal, filtering clay, or the like. However, for the bulk of purposes for which such materials are used there is no necessity for decolorizing and in many instances, as in the present instance, the solvent may remain in the material.

It will be noted that the molecular weight range of the acceptable final products is within the ratio of 5,000 to 65,000. Experimentation with polypentaerythritols higher than hepta-pentaerythritol has resulted in compounds which appear to be in the approximate weight range of 50,000 to 60,000. This figure cannot be set exactly for the reason that the exact composition of the higher polypentaerythritols is not exactly known. An attempt was made in this case to produce a deca-pentaerythritol and the composition may uble materials. They are water-insoluble and xylene-insoluble. Such initial materials are treated in the manner described to yield materials which, as far as xylene-solubility goes, are xylene-soluble. Needless to say, the initial material could be treated with a mole or two, or thereabouts, of ethylene oxide or glycide, without bringing it within the range of my aforementioned co-pending application, Serial No. 127,771, filed November 16, 1949 (now Patent 2,552,532, granted may 15, 1951).

Similarly, after oxypropylation starts one could interrupt the procedure and introduce a mole or two of ethylene oxide, or glycide, and then resume oxypropylation. Either one of such minor modifications would not significantly, nor perhaps even detectibly, change the character of the initial raw materials or the final oxypropylation derivative. Needless to say, such variation would not be departing the slightest from the spirit of the invention.

If one examines the previous table it will be noted that starting with a raw material having a molecular weight of less than 1,000 one could obtain readily materials where the molecular weight is in excess of 30,000 or more. Stated another way, the initial raw material may contribute as little as 1% to the final product. The upper range is approximately 7%, i. e., the initial reaction contributes from a fraction of 1% up to 5%, 6% or 7% of the final product.

As pointed out previously the next series of intermediates will be described as Examples 1a through 13a, inclusive. These are the intermediates which are used in preparing the acidic esters described in Part 3 immediately following.

The equipment, procedure, etc., were the same as have been described previously. The temperature employed in this series was considerably lower than in the previous series, some compounds being prepared at modestly above the boiling point of water, about 240° to 250° F. Note that in the first series the temperature is recorded in degrees centigrade whereas in the instant series it is recorded in degrees Fahrenheit.

Example 1a

The starting material employed was commercial dipentaerythritol. The catalyst employed was caustic soda. The autoclave employed was one having a capacity of about 15 gallons or approximately 125 pounds. The equipment had all the control devices previously described. The speed of the stirrer could be varied from 150 to 350 R. P. M. 7.75 pounds of dipentaerythritol were charged into the autoclave. To this there were added 8.5 pounds of xylene and .75 pound of caustic soda. The reaction pot was flushed out with nitrogen. The autoclave was sealed and the automatic devices adjusted for injecting 43.5 pounds of propylene oxide in about a 5-hour period. The injection was at the rate of about 10 or 11 pounds per hour. This time-period was comparatively short due in part to the fact that there was present a considerable amount of catalyst. This particular oxypropylation was conducted at a temperature only slightly above the boiling point of water, to wit, 220° to 230° F. The pressure regulator was set for a maximum of 35–37 pounds per square inch. Since the propylene oxide reacted rather rapidly, at no time did the pressure rise beyond 34 pounds per square inch and it is probable that the bulk of the reaction took place at a lower pressure. The initial introduction of the propylene oxide was not started until the heating devices had raised the temperature to about the boiling point of water and, in fact, somewhat beyond.

As pointed out previously the reaction was complete in what was in reality a comparatively short period. At the end of this reaction part of the reaction mass was withdrawn as a sample and the remainder subjected to further oxypropylation as described in Example 2a immediately following.

Example 2a 52.63 pounds of the reaction mass equivalent to 6.75 pounds of dipentaerythritol, 37.85 pounds of propylene oxide, .65 pound of caustic soda and 7.38 pounds of solvent, and identified as Example 1a, preceding, were subjected to further oxypropylation under substantially the same conditions as described in Example 1a, particularly in regard to temperature and pressure. No additional catalyst was introduced. The reaction time was 4 hours. The amount of oxide introduced was 21.5 pounds. This was introduced at the rate of about 7 pounds per hour. At the completion of the reaction part of the mass was withdrawn as a sample and the remainder subjected to further oxypropylation as described in the next succeeding example.

Example 3a 50.63 pounds of the reaction mass previously identified as Example 2a, and equivalent to 4.62 pounds of dipentaerythritol, 40.51 pounds of propylene oxide, .45 pound of caustic soda, and 5.05 pounds of solvent, were subjected to further oxypropylation in the manner described in the two preceding examples. In this instance, however, the temperature employed was very slightly higher than in Examples 1a and 2a, preceding. The temperature employed was 240° to 250° F. The pressure was lower, to wit, 20–25 pounds. It appeared that the higher temperature made the propylene oxide react a little faster than previously. No catalyst was added in this particular example nor in succeeding Examples 4a, 5a and 6a. For convenience, no further reference will be made to temperature or pressure in Examples 4a, 5a and 6a, for the reason that they are identical with the instant example.

The time required to add the oxide was 4 hours. The amount of oxide added was 21.25 pounds. The time required to add it was 4 hours. The rate of addition was about 6 or 7 pounds per hour. At the completion of the reaction part of the sample was withdrawn and the remainder subjected to further oxypropylation as noted in Example 4a, immediately following.

Example 4a 51.63 pounds of the reaction mass equivalent to 3.32 pounds of dipentaerythritol, 44.35 pounds of propylene oxide, .33 pound of caustic soda, and 3.63 pounds of solvent, were subjected to further oxypropylation as previously noted. 18.25 pounds of propylene oxide were added in a 5-hour period at a rate of about 4 to 5 pounds per hour. At the end of the reaction part of the sample was withdrawn and the remainder subjected to further oxypropylation as noted in Example 5a, following.

Example 5a 50.13 pounds of reaction mass previously identified as Example 4a and equivalent to 2.48 pounds of dipentaerythritol, 46.7 of propylene oxide, and .24 pound of caustic soda and 2.71 pounds of solvent, were subjected to further oxypropylation in the manner previously described. The amount of propylene oxide added was 21 pounds. It was added in a 7-hour period at the rate of about 3½ pounds per hour. At the completion of the reaction of the sample was withdrawn and the remainder subjected to a final oxypropylation as described in Example 6a, immediately following.

Example 6a 53.76 pounds of reaction mass previously identified as Example 5a, and equivalent to 1.82 pounds of dipentaerythritol, 49.77 pounds of propylene oxide, .18 pound of caustic soda, and 1.99 pounds of solvent, were subjected to oxypropylation with 12.5 pounds of propylene oxide. The time required was 7 hours and the rate was approximately 2 pounds per hour.

The series of examples, 7a through 13a, is comparable to previous series, Examples 1a through 6a, except that the initial material is tripentaerythritol instead of dipentaerythritol. The procedure is obviously comparable to that used in Examples 1a through 6a, and also conforms to what has been said previously.

Example 7a

The initial charge was 7.5 pounds of tripentaerythritol along with 17 pounds of xylene as a solvent, and .75 pound of caustic soda. The amount of propylene oxide added was 19.75 pounds. The addition was made at the rate of about 10 to 12 pounds per hour. A comparatively higher temperature was noted in this particular oxypropylation, to wit, 300° to 320° F. (not centigrade). The pressure devices were set for a maximum of 35-37 pounds per square inch. Subsequently both the temperature and pressure were lower. Since the initial reactant was not soluble in xylene there was some tendency for the reaction to be sluggish until it was at least partially soluble in xylene or completely soluble in xylene. As soon as the reaction was complete part of the sample was withdrawn and subjected to further oxypropylation as described in Example 8a, immediately following.

*Example 8a*

37.88 pounds of reaction mass previously identified as Example 7a, and equivalent to 6.32 pounds of tripentaerythritol 16.63 pounds of propylene oxide, .63 pound of catalyst, and 14.3 pounds of xylene were subjected to further oxypropylation in the same manner as previously described. The amount of propylene oxide was 22.25 pounds. It was added in a 3-hour period at a rate of about 8 or 9 pounds per hour. No additional catalyst was added. This applied also to Examples 9a, through 13a, following.

In this example the maximum temperature was 250-270° F. This applies also to Examples 9a through 13a, following. The pressure controlling devices in this instance were set for 15-20 pounds. This applies also to Examples 9a through 13a, following.

At the completion of the reaction part of the mass was withdrawn and the remainder subjected to further oxypropylation as described in the next example.

*Example 9a*

48.11 pounds of reaction mass previously identified as Example 8a, and equivalent to 5.06 pounds of tripentaerythritol, 31.13 pounds of propylene oxide, .5 pound of caustic soda and 11.42 pounds of solvent, were subjected to further oxypropylation with 43.77 pounds of propylene oxide. This oxide was added in 6 hours at the rate of about 9 pounds per hour. At the end of the reaction part of the reaction mass was withdrawn and the remainder subjected to oxypropylation as described in Example 10a, following.

*Example 10a*

49 pounds of reaction mass identified as Example 9a, preceding, and equivalent to 2.7 pounds of tripentaerythritol, 39.93 pounds of propylene oxide, .27 pound of caustic soda, and 6.10 pounds of solvent, were subjected to further oxypropylation in the manner previously described. The amount of oxide added was 14.15 pounds of propylene oxide. The oxide was added in a 3-hour period at the rate of about 6 pounds per hour. At the end of the reaction part of the reaction mass was withdrawn and the remainder subjected to further oxypropylation as described in Example 11a, immediately following.

*Example 11a*

56.51 pounds of reaction mass identified as Example 10a preceding and equivalent to 2.36 pounds of tripentaerythritol, 48.56 pounds of propylene oxide, .23 pound of caustic soda, and 5.36 pounds of solvent, were subjected to further oxypropylation in the manner previously described. The amount of oxide added was 10.5 pounds. It was added in a 3-hour period at the rate of about 5 pounds per hour. At the end of the reaction, part of the sample was withdrawn and the remainder subjected to further oxypropylation in the manner described in the next example.

*Example 12a*

59 pounds of the reaction mass identified as Example 11a, preceding, and equivalent to 2.08 pounds of tripentaerythritol, 52 pounds of propylene oxide, .2 pound of catalyst and 4.72 pounds of xylene were subjected to further oxypropylation. The amount of propylene oxide was 18 pounds and reaction time was 4 hours. The rate of oxide addition was about 5 pounds per hour. At the completion of the reaction part of the reaction mass was withdrawn and the remainder subjected to final oxypropylation as described in Example 13a, following.

*Example 13a*

56.5 pounds of reaction mass identified as Example 12a, preceding, and equivalent to 1.52 pounds of tripentaerythritol, 51.37 pounds of proplene oxide, .15 pound of caustic soda, and 3.46 pounds of xylene, were reacted with 12.25 pounds of propylene oxide in a 5½ hour period. The addition of the oxide was at the rate of about 3 pounds per hour.

What has been said preceding is presented in tabular form in Table 1, following, with some added information as to molecular weight and as to solubility of the reaction product in water, xylene, and kerosene.

TABLE 1

| Ex. No. | Composition Before | | | | Composition at End | | | | | | Max. Temp., °F. | Max. Pres., lbs. sq. in. | Time, hrs. |
|---|---|---|---|---|---|---|---|---|---|---|---|---|---|
| | H. C. Amt., lbs. | Oxide Amt., lbs. | Catalyst Amt., lbs. | Solvent Amt., lbs. | Theo. M.W. | H. C. Amt., lbs. | Oxide Amt., lbs. | Catalyst, lbs. | Solvent, lbs. | Hyd. Mol. Wt. | | | |
| 1a | 7.75 | -------- | .75 | 8.50 | 1,675 | 7.75 | 43.50 | .75 | 8.50 | 1,362 | 220-230 | 35-37 | 5 |
| 2a | 6.75 | 37.85 | .65 | 7.38 | 2,480 | 6.75 | 59.35 | .65 | 7.38 | 1,908 | 220-230 | 35-37 | 4 |
| 3a | 4.62 | 40.51 | .45 | 5.05 | 3,564 | 4.62 | 61.76 | .45 | 5.05 | 2,658 | 240-250 | 20-25 | 4 |
| 4a | 3.32 | 44.35 | .33 | 3.63 | 5,040 | 3.32 | 62.60 | .33 | 3.63 | 3,492 | 240-250 | 20-25 | 5 |
| 5a | 2.48 | 46.70 | .24 | 2.71 | 7,190 | 2.48 | 67.70 | .24 | 2.71 | 4,836 | 240-250 | 20-25 | 7 |
| 6a | 1.82 | 49.77 | .18 | 1.99 | 8,940 | 1.82 | 62.27 | .18 | 1.99 | 4,560 | 240-250 | 20-25 | 7 |
| 7a | 7.5 | -------- | .75 | 17.0 | 1,350 | 7.5 | 19.75 | .75 | 17.0 | 1,952 | 300-320 | 35-37 | 2¼ |
| 8a | 6.32 | 16.63 | .63 | 14.3 | 2,760 | 6.32 | 38.88 | .63 | 14.3 | 3,592 | 250-270 | 15-20 | 3 |
| 9a | 5.06 | 31.13 | .50 | 11.42 | 5,870 | 5.06 | 74.90 | .50 | 11.42 | 4,646 | 250-270 | 15-20 | 6 |
| 10a | 2.70 | 39.93 | .27 | 6.10 | 8,010 | 2.70 | 55.43 | .27 | 6.10 | 5,240 | 250-270 | 15-20 | 3 |
| 11a | 2.36 | 48.56 | .23 | 5.36 | 9,680 | 2.36 | 59.06 | .23 | 5.35 | 6,128 | 250-270 | 15-20 | 3 |
| 12a | 2.08 | 52.00 | .20 | 4.72 | 12,870 | 2.08 | 70.00 | .20 | 4.72 | 6,200 | 250-270 | 15-20 | 4 |
| 13a | 1.52 | 51.37 | .15 | 3.46 | 15,930 | 1.52 | 63.62 | .15 | 3.46 | 6,200 | 250-270 | 15-20 | 5½ |

In Examples 1a through 6a the hydroxy compound was dipentaerythritol. In Examples 7a through 13a the hydroxy compound was tripentaerythritol.

Example 1a was emulsifiable in water, soluble in xylene and insoluble in kerosene; Examples 2a, 3a and 4a were all insoluble in water, soluble in xylene, and insoluble in kerosene; and Examples 5a and 6a were insoluble in water, soluble in xylene, and also soluble in kerosene.

Examples 7a and 8a were insoluble in water, xylene, or kerosene; Examples 9a, 10a, and 11a were all insoluble in water, soluble in xylene, but insoluble in kerosene; and Examples 12a and 13a were insoluble in water, but soluble or emulsifiable in both xylene and kerosene.

The final products varied from a light straw color thru pale amber, to somewhat viscous fluids of a rather dark amber color in one or two instances. This was more or less the characteristic of all the oxypropylated products at the various stages. These products were, of course, slightly alkaline due to the residual caustic soda. The residual basicity, due to the catalyst, of course, would be the same as if sodium methylate had been used.

Speaking of insolubility in water or solubility in kerosene such solubility test can be made simply by shaking small amounts of the materials in a test tube with water, for instance, using 1% to 5% approximately based on the amount of water present.

Needless to say, there is no complete conversion of propylene oxide into the desired hydroxylated compounds. This is indicated by the fact that the theoretical molecular weight based on a statistical average is greater than the molecular weight calculated by usual methods on basis of acetyl or hydroxyl value. Actually, there is no completely satisfactory method for determining molecular weights of these types of compounds with a high degree of accuracy when the molecular weights exceed 2,000. In some instances the acetyl value or hydroxyl value serves as satisfactorily as an index to the molecular weight as any other procedure, subject to the above limitations, and especially in the higher molecular weight range. If any difficulty is encountered in the manufacture of the esters as described in Part 2 the stoichiometrical amount of acid or acid compound should be taken which corresponds to the indicated acetyl or hydroxyl value. This matter has been discussed in the literature and is a matter of common knowledge and requires no further elaboration. In fact, it is illustrated by some of the examples appearing in the patent previously mentioned.

PART 3

As previously pointed out the present invention is concerned with acidic esters obtained from the oxypropylated derivatives described in Part 2, immediately preceding, and polycarboxy acids, particularly tricarboxy acids like citric and dicarboxy acids such as adipic acid, phthalic acid, or anhydride, succinic acid, diglycollic acid, sebacic acid, azelaic acid, aconitic acid, maleic acid or anhydride, citraconic acid or anhydride, maleic acid or anhydric adducts as obtained by the Diels-Alder reaction from products such as maleic anhydride, and cyclopentadiene. Such acids should be heat stable so they are not decomposed during esterification. They may contain as many as 36 carbon atoms as, for example, the acids obtained by dimerization of unsaturated fatty acids, unsaturated monocarboxy fatty acids, or unsaturated monocarboxy acids having 18 carbon atoms. Reference to the acid in the hereto appended claims obviously include the anhydrides or any other obvious equivalents. My preference, however, is to use polycarboxy acids having not over 8 carbon atoms.

The production of esters including acid esters (fractional esters) from polycarboxy acids and glycols or other hydroxylated compounds is well known. Needless to say, various compounds may be used such as the low molal ester, the anhydride, the acyl chloride, etc. However, for purpose of economy it is customary to use either the acid or the anhydride. A conventional procedure is employed. On a laboratory scale one can employ a resin pot of the kind described in U. S. Patent No. 2,499,370, dated March 7, 1950, to De Groote and Keiser, and particularly with one more opening to permit the use of a porous spreader if hydrochloric acid gas is to be used as a catalylst. Such device or absorption spreader consists of minute alundum thimbles which are connected to a glass tube. One can add a sulfonic acid such as paratoluene sulfonic acid as a catalyst. There is some objection to this because in some instances there is some evidence that this acid catalylst tends to decompose or rearrange the oxypropylated compounds, and particularly likely to do so if the esterification temperature is too high. In the case of polycarboxy acids such as diglycollic acid, which is strongly acidic there is no need to add any catalyst. The use of hydrochloric acid gas has one advantage over paratoluene sulfonic acid and that is that at the end of the reaction it can be removed by flushing out with nitrogen, whereas there is no reasonably convenient means available of removing the paratoluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever.

The products obtained in Part 2 preceding may contain a basic catalyst. As a general procedure I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage needless to say a second filtration may be required. In any event the neutral or slightly acidic solution of the oxypropylated derivatives described in Part 2 is then diluted further with sufficient xylene decalin, petroleum solvent, or the like, so that one has obtained approximately a 40% solution. To this solution there is added a polycarboxylated reactant as previously described, such as phthalic anhydride, succinic acid or anhydride, diglycollic acid, etc. The mixture is refluxed until esterification is complete as indicated by elimination of water or drop in carboxyl value. Needless to say, if one produces a halfester from an anhydride such as phthalic anhydride, no water is eliminated. However, if it is obtained from diglycollic acid, for example, water is eliminated. All such procedures were conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the dehydrated sodium sulfate and probably the sodium chloride formed. The clear somewhat viscous straw-colored or amber liquid so obtained may contain a small amount of sodium sulfate or sodium chloride but, in any event, is perfectly acceptable for esterification in the manner described.

It is to be pointed out that the products here described are not polyesters in the sense that there is a plurality of both polypentaerythritol radicals and acid radicals; the product is characterized by having only one polypentaerythritol radical.

By following slight modifications of what has been said previously one can conduct the esterification on a laboratory scale with greater convenience. Obviously, if one starts with a polyhydric compound having 3 or more hydroxyls and adds a dicarboxy acid there is at least some opportunity for cross-linking and formation of insoluble materials. However, insolubility or a gelation effect can arise in other ways, for instance, possible incipient cross-linking rather than intermediate or complete cross-linking, and also the fact that there are certain limitations as far as solubility goes in any large molecule, to say nothing of peculiarities of structure insofar that one of the original reactants, for instance, dipentaerythritol or tripentaerythritol, is much less soluble in water than one might ordinarily expect on the carbon-oxygen ratio. After the water is removed in the case of the esterification by means of a water-insoluble solvent, such as benzene, xylene or the use of some other comparable solvent or mixtures, one is confronted with the fact that the acidic ester is not necessarily soluble in such nonpolar solvent, and possibly because it either does cross-link or at least gives a pseudo gel. I have used the terminology "pseudogel" for the reason that such gel is reversible as distinguished from a true non-reversible gel produced by cross-linking. The exact nature of this tendency to become insoluble or tendency toward gelation is obscure and not fully understood. In light of the effect of semi-polar solvents there may be some relationship, and in fact an important one to hydrogen bonding factors.

However, by the addition of a semi-polar solvent, such as diethyleneglycol diethylether, or some other similar solvent such as an alcohol, one tends to reduce or eliminate this effect. The alcohol, of course, must be added at the end of the reaction so as to not interfere with the esterification. The non-hydroxy semi-polar solvent can be added at the start of esterification provided it does not interfere with water removal. In any event, one can obtain a homogeneous system in which substantially the entire material is in solution.

Referring to the original oxypropylation it is to be noted that a solvent, such as xylene, is present for a matter of convenience such as giving an incipient slurry. Also, it is to be noted that the intermediates are xylene-soluble especially in the latter stages. Therefore, even if one were to use benzene alone or cymene alone, there still would be present the xylene which had been used in the oxypropylation step.

Referring now to a number of examples, for instance, Examples 1b through 36b, the solvent is indicated as "benzene, xylene, diethyl carbitol." Diethyl Carbitol is the diethyl ether of diethyleneglycol. The xylene indicated is not added xylene but refers to the xylene used in the oxypropylation step. In each instance the amount of benzene added was 50 grams. Then sufficient diethyl Carbitol was added to give the indicated weight. Actually, the amount of this latter solvent added was judged purely as a matter of convenience in the glassware employed, and when the reaction was complete the reaction mass was weighed, and this weight used to calculate the actual total solvent. In each instance an effort was made to obtain approximately a 50% solution. For instance, in Example 1b the amount of hydroxylated material, 109 grams, was on a solvent-free basis. The amount of total solvents added, 200.7 grams, included the xylene which originally accompanied the hydroxylated material. In every instance an effort was made to obtain a homogeneous solution even if there happened to be present more than 50% of solvent. The selection of 50% solvent was just arbitrary for the reason that when these compounds were tested for demulsification it was convenient to have a 50% solution. It goes without saying that a 25% solution would serve also. In practically every instance after a homogeneous solution was obtained one could subject it to distillation, particularly vacuum distillation, remove a small amount of benzene and still have a homogeneous solution having exactly 50% if desired.. In this modification one could, of course, use decalin, cymene, or some other ether such as the diethyl ether of ethyleneglycol, or a comparable ether instead of the particular one used.

What has been said previously applies also to some of the other derivatives although some other variants can be employed for instance, in Examples 40b and 41b there was a tendency for solids to separate out. In these experiments there was some solid material at the end of the procedure which apparently was soluble in methanol. Therefore, a small amount of methanol, approximately 10 to 30 grams, was added which resulted in more complete solubility. The same is true in Examples 49b, 53b, and 59b. For reasons above indicated the percentage solvent is noted because frequently it is not exactly 50%. Also these variations are of incidental value, as a convenience, but are not an inherent part of the invention. This is obvious from the hereto attached claims.

The data included in the subsequent tables, i. e., Tables 2 and 3, are self-explanatory, and very complete, and it is believed no further elaboration is necessary.

TABLE 2

| Ex. No. of Acid Ester | Ex. No. of Oxy. Cmpd. | Theo. M.W. of H.C. | Theo. Hydroxyl V. of H.C. | Actual Hydroxyl Value | Mol. Wt. Based on Actual H.V. | Amt. of Hyd. Cmpd. (grs.) | Polycarboxy Reactant | Amt. of Polycarboxy Reactant (grs.) |
|---|---|---|---|---|---|---|---|---|
| 1b | 1a | 1,675 | 201 | 248 | 1,362 | 108.9 | Diglycolic Acid | 64.3 |
| 2b | 1a | 1,675 | 201 | 248 | 1,362 | 108.9 | Oxalic Acid | 60.5 |
| 3b | 1a | 1,675 | 201 | 248 | 1,362 | 108.9 | Aconitic Acid | 83.5 |
| 4b | 1a | 1,675 | 201 | 248 | 1,362 | 108.9 | Phthalic Anhyd | 71.0 |
| 5b | 1a | 1,675 | 201 | 248 | 1,362 | 108.9 | Maleic Anhyd | 47.0 |
| 6b | 1a | 1,675 | 201 | 248 | 1,362 | 108.9 | Adipic Acid | 70.0 |
| 7b | 2a | 2,480 | 136 | 176.5 | 1,908 | 95.4 | Diglycolic Acid | 40.2 |
| 8b | 2a | 2,480 | 136 | 176.5 | 1,908 | 95.4 | Oxalic Acid | 37.8 |
| 9b | 2a | 2,480 | 136 | 176.5 | 1,908 | 95.4 | Aconitic Acid | 52.2 |
| 10b | 2a | 2,480 | 136 | 176.5 | 1,908 | 95.4 | Phthalic Anhyd | 44.4 |
| 11b | 2a | 2,480 | 136 | 176.5 | 1,908 | 95.4 | Maleic Anhyd | 29.4 |
| 12b | 2a | 2,480 | 136 | 176.5 | 1,908 | 95.4 | Adipic Acid | 43.8 |
| 13b | 3a | 3,564 | 94.5 | 127 | 2,658 | 106.3 | Diglycolic Acid | 32.2 |
| 14b | 3a | 3,564 | 94.5 | 127 | 2,658 | 106.3 | Oxalic Acid | 30.3 |
| 15b | 3a | 3,564 | 94.5 | 127 | 2,658 | 106.3 | Aconitic Acid | 41.8 |
| 16b | 3a | 3,564 | 94.5 | 127 | 2,658 | 106.3 | Adipic Acid | 35.0 |
| 17b | 3a | 3,564 | 94.5 | 127 | 2,658 | 106.3 | Phthalic Anhyd | 35.5 |
| 18b | 3a | 3,564 | 94.5 | 127 | 2,658 | 106.3 | Maleic Anhyd | 23.5 |
| 19b | 4a | 5,040 | 67.0 | 96.5 | 3,492 | 104.8 | Diglycolic Acid | 24.0 |
| 20b | 4a | 5,040 | 67.0 | 96.5 | 3,492 | 104.8 | Oxalic Acid | 11.3 |
| 21b | 4a | 5,040 | 67.0 | 96.5 | 3,492 | 104.8 | Aconitic Acid | 41.8 |
| 22b | 4a | 5,040 | 67.0 | 96.5 | 3,492 | 104.8 | Adipic Acid | 35.0 |
| 23b | 4a | 5,040 | 67.0 | 96.5 | 3,492 | 104.8 | Phthalic Anhyd | 35.5 |
| 24b | 4a | 5,040 | 67.0 | 96.5 | 3,492 | 104.8 | Maleic Anhyd | 17.6 |
| 25b | 5a | 7,190 | 47.0 | 69.7 | 4,836 | 96.7 | Diglycolic Acid | 16.1 |
| 26b | 5a | 7,190 | 47.0 | 69.7 | 4,836 | 96.7 | Oxalic Acid | 18.1 |
| 27b | 5a | 7,190 | 47.0 | 69.7 | 4,836 | 96.7 | Aconitic Acid | 20.9 |
| 28b | 5a | 7,190 | 47.0 | 69.7 | 4,836 | 96.7 | Adipic Acid | 17.5 |
| 29b | 5a | 7,190 | 47.0 | 69.7 | 4,836 | 96.7 | Phthalic Anhyd | 17.8 |
| 30b | 5a | 7,190 | 47.0 | 69.7 | 4,836 | 96.7 | Maleic Anhyd | 11.8 |
| 31b | 6a | 8,940 | 37.7 | 73.7 | 4,560 | 91.2 | Diglycolic Acid | 16.1 |
| 32b | 6a | 8,940 | 37.7 | 73.7 | 4,560 | 91.2 | Oxalic Acid | 18.1 |
| 33b | 6a | 8,940 | 37.7 | 73.7 | 4,560 | 91.2 | Aconitic Acid | 20.9 |
| 34b | 6a | 8,940 | 37.7 | 73.7 | 4,560 | 91.2 | Adipic Acid | 17.5 |
| 35b | 6a | 8,940 | 37.7 | 73.7 | 4,560 | 91.2 | Phthalic Anhyd | 17.8 |
| 36b | 6a | 8,940 | 37.7 | 73.7 | 4,560 | 91.2 | Maleic Anhyd | 11.8 |
| 37b | 8a | 2,760 | 163.5 | 230 | 1,952 | 97.6 | Diglycolic Acid | 53.6 |
| 38b | 8a | 2,760 | 163.5 | 230 | 1,952 | 97.6 | Oxalic Acid | 50.4 |
| 39b | 8a | 2,760 | 163.5 | 230 | 1,952 | 97.6 | Aconitic Acid | 69.6 |
| 40b | 8a | 2,760 | 163.5 | 230 | 1,952 | 97.6 | Adipic Acid | 58.4 |
| 41b | 8a | 2,760 | 163.5 | 230 | 1,952 | 97.6 | Phthalic Anhyd | 59.2 |
| 42b | 8a | 2,760 | 163.5 | 230 | 1,952 | 97.6 | Maleic Anhyd | 39.2 |
| 43b | 9a | 5,870 | 76.5 | 125.0 | 3,592 | 107.8 | Diglycolic Acid | 32.2 |
| 44b | 9a | 5,870 | 76.5 | 125.0 | 3,592 | 107.8 | Oxalic Acid | 30.6 |
| 45b | 9a | 5,870 | 76.5 | 125.0 | 3,592 | 107.8 | Aconitic Acid | 41.8 |
| 46b | 9a | 5,870 | 76.5 | 125.0 | 3,592 | 107.8 | Adipic Acid | 35.0 |
| 47b | 9a | 5,870 | 76.5 | 125.0 | 3,592 | 107.8 | Phthalic Anhyd | 35.5 |
| 48b | 9a | 5,870 | 76.5 | 125.0 | 3,592 | 107.8 | Maleic Anhyd | 23.5 |
| 49b | 10a | 8,010 | 56.0 | 96.9 | 4,640 | 92.8 | Diglycolic Acid | 21.5 |
| 50b | 10a | 8,010 | 56.0 | 96.9 | 4,640 | 92.8 | Oxalic Acid | 20.2 |
| 51b | 10a | 8,010 | 56.0 | 96.9 | 4,640 | 92.8 | Aconitic Acid | 27.8 |
| 52b | 10a | 8,010 | 56.0 | 96.9 | 4,640 | 92.8 | Adipic Acid | 23.4 |
| 53b | 10a | 8,010 | 56.0 | 96.9 | 4,640 | 92.8 | Phthalic Anhyd | 23.7 |
| 54b | 10a | 8,010 | 56.0 | 96.9 | 4,640 | 92.8 | Maleic Anhyd | 17.5 |
| 55b | 11a | 9,680 | 46.4 | 86.0 | 5,240 | 104.8 | Diglycolic Acid | 21.5 |
| 56b | 11a | 9,680 | 46.4 | 86.0 | 5,240 | 104.8 | Oxalic Acid | 20.2 |
| 57b | 11a | 9,680 | 46.4 | 86.0 | 5,240 | 104.8 | Aconitic Acid | 27.8 |
| 58b | 11a | 9,680 | 46.4 | 86.0 | 5,240 | 104.8 | Adipic Acid | 23.4 |
| 59b | 11a | 9,680 | 46.4 | 86.0 | 5,240 | 104.8 | Phthalic Anhyd | 23.7 |
| 60b | 11a | 9,680 | 46.4 | 86.0 | 5,240 | 104.8 | Maleic Anhyd | 15.7 |
| 61b | 12a | 12,870 | 34.9 | 73.4 | 6,128 | 122.6 | Diglycolic Acid | 21.5 |
| 62b | 12a | 12,870 | 34.9 | 73.4 | 6,128 | 122.6 | Oxalic Acid | 20.2 |
| 63b | 12a | 12,870 | 34.9 | 73.4 | 6,128 | 122.6 | Aconitic Acid | 27.8 |
| 64b | 12a | 12,870 | 34.9 | 73.4 | 6,128 | 122.6 | Adipic Acid | 23.4 |
| 65b | 12a | 12,870 | 34.9 | 73.4 | 6,128 | 122.6 | Phthalic Anhyd | 23.7 |
| 66b | 12a | 12,870 | 34.9 | 73.4 | 6,128 | 122.6 | Maleic Anhyd | 15.7 |
| 67b | 13a | 15,930 | 28.1 | 72.4 | 6,200 | 124 | Diglycolic Acid | 21.5 |
| 68b | 13a | 15,930 | 28.1 | 72.4 | 6,200 | 124 | Oxalic Acid | 20.2 |
| 69b | 13a | 15,930 | 28.1 | 72.4 | 6,200 | 124 | Aconitic Acid | 27.8 |
| 70b | 13a | 15,930 | 28.1 | 72.4 | 6,200 | 124 | Adipic Acid | 23.4 |
| 71b | 13a | 15,930 | 28.1 | 72.4 | 6,200 | 124 | Phthalic Anhyd | 23.7 |
| 72b | 13a | 15,930 | 28.1 | 72.4 | 6,200 | 124 | Maleic Anhyd | 15.7 |

TABLE 3

| Ex. No. of Acid Ester | Solvent | Amt. Solvent (grs.) | Max. Esterification Temp., °C. | Time of Esterification (hrs.) | Water Out (cc.) | Percent Solvent |
|---|---|---|---|---|---|---|
| 1b | Benzene, Xylene, Diethylcarbitol. | 200.7 | 165 | 1½ | 8.7 | 55 |
| 2b | do | 179.6 | 160 | 2 | 26.0 | 55 |
| 3b | do | 219.9 | 165 | 2 | 8.7 | 54 |
| 4b | do | 215.3 | 150 | 2 | 0.8 | 55 |
| 5b | do | 191.1 | 165 | 1¼ | 1.0 | 55 |
| 6b | do | 206.4 | 165 | 2¼ | 8.7 | 55 |
| 7b | do | 130.2 | 165 | 1¾ | 5.4 | 50 |
| 8b | do | 117.0 | 147 | 1¾ | 16.2 | 50 |
| 9b | do | 142.2 | 163 | 2½ | 5.4 | 50 |
| 10b | do | 139.8 | 160 | 3 | Trace | 50 |
| 11b | do | 124.8 | 150 | 3 | Trace | 50 |
| 12b | do | 134.4 | 180 | 8¾ | 4.8 | 50 |
| 13b | do | 134.2 | 170 | 2 | 4.3 | 50 |
| 14b | do | 123.6 | 150 | 2 | 13.0 | 50 |
| 15b | do | 143.8 | 155 | 2 | 4.3 | 50 |
| 16b | do | 137.0 | 185 | 14¾ | 4.3 | 50 |
| 17b | do | 141.8 | 190 | 11¼ | Trace | 50 |

TABLE 3—Continued

| Ex. No. of Acid Ester | Solvent | Amt. Solvent (grs.) | Max. Esterification Temp., °C. | Time of Esterification (hrs.) | Water Out (cc.) | Percent Solvent |
|---|---|---|---|---|---|---|
| 18b | do | 129.8 | 160 | 3¼ | Trace | 50 |
| 19b | do | 131.2 | 165 | 1 | 2.6 | 51 |
| 20b | do | 61.3 | 145 | 1 | 5.0 | 52 |
| 21b | do | 178.3 | 145 | 1¾ | 5.5 | 51 |
| 22b | do | 175.0 | 140 | 3½ | 3.6 | 50 |
| 23b | do | 178.5 | 145 | 3 | Trace | 51 |
| 24b | do | 126.4 | 165 | 1 | Trace | 52 |
| 25b | do | 112.9 | 180 | ¾ | 2.6 | 50 |
| 26b | do | 107.6 | 155 | ¾ | 6.8 | 51 |
| 27b | do | 118.1 | 180 | ¾ | 2.2 | 52 |
| 28b | do | 114.7 | 170 | ¾ | 2.6 | 51 |
| 29b | do | 117.3 | 180 | 2¼ | Trace | 51 |
| 30b | do | 110.0 | 165 | ¾ | Trace | 51 |
| 31b | do | 107.9 | 195 | ¾ | 2.8 | 51 |
| 32b | do | 102.5 | 168 | ¾ | 7.0 | 51 |
| 33b | do | 112.3 | 175 | ¾ | 3.2 | 51 |
| 34b | do | 109.9 | 175 | ¾ | 2.2 | 51 |
| 35b | do | 112.0 | 183 | ¾ | 0.6 | 51 |
| 36b | do | 105.7 | 176 | ¾ | 0.5 | 51 |
| 37b | do | 202.8 | 165 | 1 | 7.2 | 59 |
| 38b | do | 185.2 | 155 | 1 | 21.6 | 59 |
| 39b | do | 218.8 | 160 | 1¼ | 7.2 | 58 |
| 40b | do | 207.6 | 165 | 2¼ | 7.2 | 58 |
| 41b | do | 214.0 | 170 | 1 | 1.0 | 58 |
| 42b | do | 193.8 | 160 | 1 | 1.0 | 59 |
| 43b | do | 165.8 | 145 | ¾ | 4.6 | 55 |
| 44b | do | 150.6 | 160 | 1½ | 13.0 | 55 |
| 45b | do | 169.8 | 170 | ½ | 4.6 | 54 |
| 46b | do | 162.8 | 145 | ½ | 4.4 | 54 |
| 47b | do | 167.3 | 175 | 1¼ | 0.6 | 54 |
| 48b | do | 155.9 | 168 | 1 | 1.0 | 54 |
| 49b | do | 126.0 | 150 | 1 | 3.0 | 53 |
| 50b | do | 119.0 | 160 | 1 | 8.8 | 53 |
| 51b | do | 133.6 | 165 | 1 | 3.0 | 53 |
| 52b | do | 129.2 | 160 | 1 | 3.0 | 53 |
| 53b | Benzene, Xylene, Diethylcarbitol, Methanol. | 131.9 | 155 | 1¼ | 1.0 | 53 |
| 54b | Benzene, Xylene, Diethylcarbitol. | 122.7 | 150 | 1¼ | 1.0 | 53 |
| 55b | do | 123.3 | 145 | ¾ | 3.0 | 50 |
| 56b | do | 116.4 | 135 | 1 | 8.6 | 50 |
| 57b | do | 129.6 | 140 | ¾ | 3.0 | 50 |
| 58b | do | 125.2 | 147 | 1 | 3.0 | 50 |
| 59b | Benzene, Xylene, Diethylcarbitol, Methanol. | 127.7 | 153 | ¾ | 0.8 | 50 |
| 60b | Benzene, Xylene, Diethylcarbitol. | 119.7 | 143 | ¾ | 018 | 50 |
| 61b | do | 141.1 | 147 | ¾ | 3.0 | 50 |
| 62b | do | 133.8 | 132 | ¾ | 9.0 | 50 |
| 63b | do | 146.4 | 142 | ¾ | 4.0 | 50 |
| 64b | do | 143.0 | 155 | ¾ | 3.0 | 50 |
| 65b | do | 146.0 | 150 | ¾ | 0.3 | 50 |
| 66b | do | 138.0 | 140 | ¾ | 0.3 | 50 |
| 67b | do | 142.3 | 155 | ¾ | 3.2 | 50 |
| 68b | do | 135.6 | 152 | 1 | 8.6 | 50 |
| 69b | do | 148.0 | 162 | ¾ | 3.8 | 50 |
| 70b | do | 144.4 | 160 | 1 | 3.0 | 50 |
| 71b | do | 147.7 | 160 | 1¼ | ——— | 50 |
| 72b | do | 138.7 | 165 | 1¼ | 1.0 | 50 |

The procedure for manufacturing the esters has been illustrated by preceding examples. If for any reason reaction does not take place in a manner that is acceptable, attention should be directed to the following details: (a) Recheck the hydroxyl or acetyl value of the oxypropylated hydroxy compounds of the kind specified and use a stoichiometrically equivalent amount of acid; (b) if the reaction does not proceed with reasonable speed, either raise the temperature indicated or else extend the period of time up to 12 or 16 hours if need be; (c) if necessary, use ½% of paratoluene sulfonic acid or some other acid as a catalyst; (d) if the esterification does not produce a clear product a check should be made to see if an inorganic salt such as sodium chloride or sodium sulfate is not precipitating out. Such salt should be eliminated, at least for exploration experimentation, and can be removed by filtering. Everything else being equal, as the size of the molecule increases and the reactive hydroxyl radical represents a smaller fraction of the entire molecule, more difficulty is involved in obtaining complete esterification.

Even under the most carefully controlled conditions of oxypropylation involving comparatively low temperatures and long time of reaction there are formed certain compounds whose composition is still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances an attempt to react the stoichiometric amount of a polycarboxy acid with the oxypropylated derivative results in an excess of the carboxylated reactant for the reason that apparently under conditions of reaction less reactive hydroxyl radicals are present than indicated by the hydroxyl value. Under such circumstances there is simply a residue of the carboxylic reactant which can be removed by filtration or, if desired, the esterification procedure can be repeated using an appropriately reduced ratio of carboxylic reactant.

Even the determination of the hydroxyl value and conventional procedure leaves much to be desired due either to the cogeneric materials previously referred to, or for that matter, the presence of any inorganic salts or propylene oxide. Obviously this oxide should be eliminated.

The solvent employed, if any, can be removed from the finished ester by distillation and particularly vacuum distillation. The final products or liquids are generally straw or pale amber through dark amber in color, and some have a distinct yellowish cast and show moderate viscosity, or sometimes increased viscosity in light of what has been said previously in regard to cross-linking, gelation, etc. Unless there is some reason to do otherwise my preference is to handle these esters as 50% solutions in suitable solvents. They can be bleached with bleaching clays, filtering chars, and the like. However, for the purpose of demulsification or the like color is not a factor and decolorization is not justified.

PART 4

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio or 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of my process.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and reintroduces it into the top of the tank, the demulsifier being added, for example, at the suction side of said circulating pump.

In a second type of treating procedure, the demulsifier is introduced into the well fluids at the well-head or at some point between the wellhead and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation.

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluid from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of the product of Example 25b or 61b with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier. A mixture which illustrates such combination is the following:

Oxyalkylated derivative, for example, the product of Example 25b or 61b, 20%;

A cyclohexylamine salt of a polypropylated naphthalene monosulfonic acid, 24%;

An ammonium salt of a polypropylated naphthalene monosulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

Having thus described my invention what I claim as new and desire to secure by Letters Patent is:

1. A process for breaking petroleum emulsions of the water-in-oil type characterized by subjecting the emulsion to the action of a demulsifier including acidic fractional esters; said acidic fractional esters being obtained by reaction between (A) a polycarboxy acid and (B) high molal oxypropylation derivatives of polypentaerythritols with the proviso that (a) the initial polyhydric reactant be free from any radical having at least 8 uninterrupted carbon atoms; (b) the oxypropylation end product be within the molecular weight range of 5,000 to 65,000 on an average statistical basis; (c) the oxypropylation end product be xylene-soluble; (d) the xylene solubility characteristics of the oxypropylation end product be substantially the result of the oxypropylation step; (e) the initial polyhydric reactant represent not more than 7% by weight of the oxypropylation end product on a statistical basis; and that (f) the preceding provisos be based on complete reaction involving the propylene oxide and the initial polyhydric reactant; with the proviso that the ratio of (A) to (B) be one mole of the polycarboxy acid for each available hydroxyl radical.

2. A process for breaking petroleum emulsions of the water-in-oil type characterized by subjecting the emulsion to the action of a demulsifier including acidic fractional esters; said acidic fractional esters being obtained by reaction between (A) a polycarboxy acid and (B) high molal oxypropylation derivatives of polypentaerythritols with the proviso that (a) the initial polyhydric reactant be free from any radical having at least 8 uninterrupted carbon atoms; (b) the oxypropylation end product be within the molecular weight range of 5,000 to 65,000 on an average statistical basis; (C) the oxypropylation end product be substantially the result of the solubility characteristics of the oxypropylation end product be substantially the result of the oxypropylation step; (e) the initial polyhydric reactant represent not more than 7% by weight of the oxypropylation end product on a statistical basis; (f) the oxypropylation end product be substantially water-insoluble; and that (g) the preceding provisos be based on complete reaction involving the propylene oxide and the initial polyhydric reactant; with the proviso that the ratio of (A) to (B) be one mole of the polycarboxyl acid for each available hydroxyl radical.

3. A process for breaking petroleum emulsions of the water-in-oil type characterized by subjecting the emulsion to the action of a demulsifier including acidic fractional esters; said acidic fractional esters being obtained by reaction between (A) a polycarboxy acid and (B) high molal oxypropylation derivatives of polypentaerythritols with the proviso that (a) the initial polyhydric reactant be free from any radical having at least 8 uninterrupted carbon atoms; (b) the oxypropylation end product be within the molecular weight range of 5,000 to 65,000 on an average statistical basis; (c) the oxypropylation end product be xylene-soluble; (d) the xylene solubility characteristics of the oxypropylation end product be substantially the result of the oxypropylation step; (e) the initial polyhydric reactant represent not more than 7% by weight of the oxypropylation end product on a statistical basis; (f) the oxypropylation end product be substantially water-insoluble; and that (g) the preceding provisos be based on complete reaction involving the propylene oxide and the initial polyhydric reactant; with the proviso that the ratio of (A) to (B) be one mole of the polycarboxy acid for each available hydroxyl radical; and with the further proviso that the initial polypentaerythritol have at least 2 and not more than 3 pentaerythritol radicals.

4. A process for breaking petroleum emulsions of the water-in-oil type characterized by subjecting the emulsion to the action of a demulsifier including acidic fractional esters; said acidic fractional esters being obtained by reaction between (A) a polycarboxy acid and (B) high molal oxypropylation derivatives of polypentaerythritols with the proviso that (a) the initial polyhydric reactant be free from any radical having at least 8 uninterrupted carbon atoms; (b) the oxypropylation end product be within the molecular weight range of 5,000 to 65,000 on an average statistical basis; (c) the oxypropylation end product be xylene-soluble and kerosene-soluble at least to the extent of being emulsifiable in kerosene; (d) the xylene solubility characteristics of the oxypropylation end product be substantially the result of the oxypropylation step; (e) the initial polyhydric reactant represent not more than 7% by weight of the oxypropylation end product on a statistical basis; (f) the oxypropylation end product be substantially water-insoluble; and that (g) the preceding provisos be based on complete reaction involving the propylene oxide and the initial polyhydric reactant; with the proviso that the ratio of (A) to (B) be one mole of the polycarboxy acid for each available hydroxyl radical; and with the further proviso that the initial polypentaerythritol have at least 2 and not more than 3 pentaerythritol radicals.

5. A process for breaking petroleum emulsions of the water-in-oil type characterized by subjecting the emulsion to the action of a demulsifier including acidic fractional esters; said acidic fractional esters being obtained by reaction between (A) a polycarboxy acid and (B) high molal oxypropylation derivatives of polypentaerythritols with the proviso that (a) the initial polyhydric reactant be free from any radical having at least 8 uninterrupted carbon atoms; (b) the oxypropylation end product be within the molecular weight range of 5,000 to 65,000 on an average statistical basis; (c) the oxypropylation end product be xylene-soluble and kerosene-soluble at least to the extent of being emulsifiable in kerosene; (d) the xylene solubility characteristics of the oxypropylation end product be substantially the result of the oxypropylation step; (e) the initial polyhydric reactant represent not more than 7% by weight of the oxypropylation end product on a statistical basis; (f) the oxypropylation end product be substantially water-insoluble; and that (g) the preceding provisos be based on complete reaction involving the propylene oxide and the initial polyhydric reactant; with the proviso that the ratio of (A) to (B) be one mole of the polycarboxy acid for each available hydroxyl radical; and with the further proviso that the initial polypentaerythritol have at least 2 and not more than 3 pentaerythritol radicals; and with the final proviso that the polycarboxy acid have not more than 8 carbon atoms.

6. A process for breaking petroleum emulsions of the water-in-oil type characterized by subjecting the emulsion to the action of a demulsifier including acidic fractional esters; said acidic fractional esters being obtained by reaction between (A) a dicarboxy acid and (B) high molal oxypropylation derivatives of polypentaerythritols with the proviso that (a) the initial polyhydric reactant be free from any radical having at least 8 uninterrupted carbon atoms; (b) the oxypropylation end product be within the molecular weight range of 5,000 to 65,000 on an average statistical basis; (c) the oxypropylation end product be xylene-soluble and kerosene-soluble at least to the extent of being emulsifiable in kerosene; (d) the xylene solubility characteristics of the oxypropylation end product be substantially the result of the oxypropylation step; (e) the initial polyhydric reactant represent not more than 7% by weight of the oxypropylation end product on a statistical basis; (f) the oxypropylation end product be substantially water-insoluble; and that (g) the preceding provisos be based on complete reaction involving the propylene oxide and the initial polyhydric reactant; with the proviso that the ratio of (A) to (B) be one mole of the dicarboxy acid for each available hydroxyl radical; and that the dicarboxy acid have not more than 8 carbon atoms.

7. The process of claim 6 wherein the dicarboxy acid is phthalic acid.

8. The process of claim 6 wherein the dicarboxy acid is maleic acid.

9. The process of claim 6 wherein the dicarboxy acid is succinic acid.

10. The process of claim 6 wherein the dicarboxy acid is citraconic acid.

11. The process of claim 6 wherein the dicarboxy acid is diglycollic acid.

his
MELVIN × DE GROOTE.
mark

Witnesses to mark:
W. C. ADAMS,
I. S. DE GROOTE.

REFERENCES CITED

The following references are of record in the file of this patent:

UNITED STATES PATENTS

| Number | Name | Date |
|---|---|---|
| 2,344,980 | De Groote et al. | Mar. 28, 1944 |
| 2,454,808 | Kirkpatrick et al. | Nov. 30, 1948 |
| 2,552,528 | De Groote | May 15, 1951 |
| 2,552,529 | De Groote | May 15, 1951 |
| 2,552,532 | De Groote | May 15, 1951 |
| 2,552,533 | De Groote | May 15, 1951 |
| 2,554,667 | De Groote | May 29, 1951 |
| 2,562,878 | Blair | Aug. 7, 1951 |